US009900789B2

United States Patent
Park et al.

(10) Patent No.: US 9,900,789 B2
(45) Date of Patent: Feb. 20, 2018

(54) METHOD FOR UE CANCELLING INTERFERENCE FROM NEIGHBOURING CELLS IN WIRELESS COMMUNICATION SYSTEM AND APPARATUS THEREFOR

(71) Applicant: LG ELECTRONICS INC., Seoul (KR)

(72) Inventors: Jonghyun Park, Seoul (KR); Kijun Kim, Seoul (KR); Hyungtae Kim, Seoul (KR); Inkwon Seo, Seoul (KR); Seungmin Lee, Seoul (KR); Youngtae Kim, Seoul (KR); Kunil Yum, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 48 days.

(21) Appl. No.: 14/906,802

(22) PCT Filed: Dec. 11, 2014

(86) PCT No.: PCT/KR2014/012199
§ 371 (c)(1),
(2) Date: Jan. 21, 2016

(87) PCT Pub. No.: WO2015/099330
PCT Pub. Date: Jul. 2, 2015

(65) Prior Publication Data
US 2016/0157108 A1     Jun. 2, 2016

Related U.S. Application Data

(60) Provisional application No. 61/920,483, filed on Dec. 24, 2013.

(51) Int. Cl.
*H04W 72/04*     (2009.01)
*H04W 72/08*     (2009.01)
(Continued)

(52) U.S. Cl.
CPC ............ *H04W 24/02* (2013.01); *H04B 15/02* (2013.01); *H04J 11/0053* (2013.01);
(Continued)

(58) Field of Classification Search
CPC ..... H04W 24/02; H04W 48/16; H04W 72/04; H04W 72/08; H04W 72/042;
(Continued)

(56) References Cited

U.S. PATENT DOCUMENTS

2008/0108363 A1    5/2008   Yu et al.
2011/0183692 A1    7/2011   Lee et al.
(Continued)

FOREIGN PATENT DOCUMENTS

EP          2661002 A1    11/2013
JP       2013-255248 A    12/2013
(Continued)

OTHER PUBLICATIONS

LG Electronics, "Considerations on network coordination and signaling for NAICS," 3GPP TSG RAN WG1 Meeting #75, San Francisco, USA, Nov. 11-15, 2013, R1-135493, 4 pages.
(Continued)

*Primary Examiner* — Mark Rinehart
*Assistant Examiner* — Natali N Pascual Peguero
(74) *Attorney, Agent, or Firm* — Birch, Stewart, Kolasch & Birch, LLP

(57) ABSTRACT

In this application, a method for a terminal cancelling interference from a neighboring cell is disclosed. More specifically, the method comprises the steps of: receiving one or more interference cancellation assistance information indicating one of a plurality of parameter combinations for detecting an interference signal from the neighboring cell; detecting an interference signal from the neighboring cell, based on the one or more interference cancellation assis-
(Continued)

tance information and cancelling the interference signal in signals received from a serving cell, wherein the interference signal is a downlink data channel of the neighboring cell or a downlink control channel of the neighboring cell, and the plurality of parameter combinations is configured through a higher layer.

8 Claims, 12 Drawing Sheets

(51) Int. Cl.
H04W 24/02 (2009.01)
H04B 15/02 (2006.01)
H04L 25/03 (2006.01)
H04J 11/00 (2006.01)
H04W 48/16 (2009.01)

(52) U.S. Cl.
CPC ......... *H04L 25/0328* (2013.01); *H04W 48/16* (2013.01); *H04W 72/042* (2013.01); *H04W 72/082* (2013.01)

(58) Field of Classification Search
CPC ........... H04W 56/003; H04W 72/1226; H04W 72/082; H04L 25/0328
USPC ................. 370/268, 269, 329, 336
See application file for complete search history.

(56) References Cited

U.S. PATENT DOCUMENTS

| 2012/0021753 A1* | 1/2012 | Damnjanovic | H04W 72/082 455/450 |
| 2012/0258724 A1 | 10/2012 | Kim et al. | |
| 2014/0293971 A1* | 10/2014 | Yoo | H04W 56/003 370/336 |

FOREIGN PATENT DOCUMENTS

| KR | 10-2008-0041323 A | 5/2008 |
| KR | 10-2010-0015172 A | 2/2010 |
| KR | 10-2012-0112567 A | 10/2012 |
| WO | WO 2013/170908 A1 | 11/2013 |

OTHER PUBLICATIONS

LG Electronics, "Discussion on scenarios and receiver types for NAICS," 3GPP TSG RAN WG1 Meeting #72bis, Chicago, USA, Apr. 15-19, 2013, R1-131310, 1-4 pages.

Mediatek Inc., "Text Proposal on TR36.866 (NAICS Receiver Assumptions)," 3GPP TSG RAN WG4 Meeting #68bis, Oct. 7-11, 2013, Riga, Latvia, R4-135493, 4 pages.

Panasonic, "Signalling mechanisms for interference information," 3GPP TSG RAN WG1 Meeting #75, San Francisco, USA, Nov. 11-15, 2013, R1-135401, 4 pages.

Institute for Information Industry (III), "Small cell scenarios for Network Assisted Interference Cancellation and Suppression for LTE," 3GPP TSG RAN WG1 Meeting #72bis, Chicago, USA, Apr. 15-19, 2013, R1-131107, pp. 1-5.

* cited by examiner (a) Control-Plane Protocol Stack (b) User-Plane Protocol Stack

METHOD FOR UE CANCELLING INTERFERENCE FROM NEIGHBOURING CELLS IN WIRELESS COMMUNICATION SYSTEM AND APPARATUS THEREFOR

CROSS REFERENCE TO RELATED APPLICATIONS

This application is the National Phase of PCT International Application No. PCT/KR2014/012199, filed on Dec. 11, 2014, which claims priority under 35 U.S.C. 119(e) to U.S. Provisional Application No. 61/920,483, filed on Dec. 24, 2013, all of which are hereby expressly incorporated by reference into the present application.

TECHNICAL FIELD

The present invention relates to a wireless communication system and, more specifically, to a method for cancelling, by a UE, interference from a neighbor cell in a wireless communication system and an apparatus therefor.

BACKGROUND ART

A brief description will be given of a 3rd Generation Partnership Project Long Term Evolution (3GPP LTE) system as an example of a wireless communication system to which the present invention can be applied.

FIG. 1 illustrates a configuration of an Evolved Universal Mobile Telecommunications System (E-UMTS) network as an exemplary wireless communication system. The E-UMTS system is an evolution of the legacy UMTS system and the 3GPP is working on the basics of E-UMTS standardization. E-UMTS is also called an LTE system. For details of the technical specifications of UMTS and E-UMTS, refer to Release 7 and Release 8 of "3rd Generation Partnership Project; Technical Specification Group Radio Access Network", respectively.

Referring to FIG. 1, the E-UMTS system includes a User Equipment (UE), an evolved Node B (eNode B or eNB), and an Access Gateway (AG) which is located at an end of an Evolved UMTS Terrestrial Radio Access Network (E-UTRAN) and connected to an external network. The eNB may transmit multiple data streams simultaneously, for broadcast service, multicast service, and/or unicast service.

A single eNB manages one or more cells. A cell is set to operate in one of the bandwidths of 1.25, 2.5, 5, 10, 15 and 20 Mhz and provides Downlink (DL) or Uplink (UL) transmission service to a plurality of UEs in the bandwidth. Different cells may be configured so as to provide different bandwidths. An eNB controls data transmission and reception to and from a plurality of UEs. Regarding DL data, the eNB notifies a particular UE of a time-frequency area in which the DL data is supposed to be transmitted, a coding scheme, a data size, Hybrid Automatic Repeat reQuest (HARD) information, etc. by transmitting DL scheduling information to the UE. Regarding UL data, the eNB notifies a particular UE of a time-frequency area in which the UE can transmit data, a coding scheme, a data size, HARQ information, etc. by transmitting UL scheduling information to the UE. An interface for transmitting user traffic or control traffic may be defined between eNBs. A Core Network (CN) may include an AG and a network node for user registration of UEs. The AG manages the mobility of UEs on a Tracking Area (TA) basis. A TA includes a plurality of cells.

While the development stage of wireless communication technology has reached LTE based on Wideband Code Division Multiple Access (WCDMA), the demands and expectation of users and service providers are increasing. Considering that other radio access technologies are under development, a new technological evolution is required to achieve future competitiveness. Specifically, cost reduction per bit, increased service availability, flexible use of frequency bands, a simplified structure, an open interface, appropriate power consumption of UEs, etc. are required.

DISCLOSURE

Technical Problem

An object of the present invention is to a method for cancelling, by a UE, interference from a neighbor cell in a wireless communication system and an apparatus therefor.

Technical Solution

To achieve these objects and other advantages and in accordance with the purpose of the invention, a method for cancelling, by a UE, interference from a neighbor cell in a wireless communication system, the method comprising: receiving one or more interference cancellation assistance information indicating one of a plurality of parameter combinations for detecting an interference signal from the neighbor cell; detecting an interference signal from the neighbor cell, based on the one or more interference cancellation assistance information; and cancelling the interference signal from signals received from a serving cell, wherein the interference signal is a downlink data channel of the neighbor cell or a downlink control channel of the neighbor cell, and wherein the plurality of parameter combinations is configured through a higher layer.

In another aspect of the present invention, a UE in a wireless communication system, comprising: a wireless communication module transmits and receives a signal with a network; and a processor configured to control the signal, wherein the processor is further configured to: control the wireless communication module to receive one or more interference cancellation assistance information indicating one of a plurality of parameter combinations for detecting an interference signal from the neighbor cell, detect an interference signal from the neighbor cell, based on the one or more interference cancellation assistance information, and cancel the interference signal from signals received from a serving cell, wherein the interference signal is a downlink data channel of the neighbor cell or a downlink control channel of the neighbor cell, and wherein the plurality of parameter combinations is configured through a higher layer.

In another aspect of the present invention, the parameter combinations include at least one of information about a modulation order of the interference signal, information about a reference signal for demodulating the interference signal and information about a symbol index at which the interference signal starts in a subframe.

In another aspect of the present invention, the one or more interference cancellation assistance information is broadcast through a downlink control channel from the neighbor cell, and the downlink data channel of the neighbor cell and the downlink control channel of the neighbor cell are detected through the same region of a subframe.

In another aspect of the present invention, the one or more interference cancellation assistance information respectively correspond to different subbands.

Advantageous Effects

According to the embodiments of the present invention, a UE can more efficiently cancel interference from a neighbor cell in a wireless communication system.

It will be appreciated by persons skilled in the art that the effects that can be achieved through the present invention are not limited to what has been particularly described hereinabove and other advantages of the present invention will be more clearly understood from the following detailed description.

BEST MODE

The configuration, operation and other features of the present invention will be understood by the embodiments of the present invention described with reference to the accompanying drawings. The following embodiments are examples of applying the technical features of the present invention to a 3GPP system.

Although, for convenience, the embodiments of the present invention are described using LTE and LTE-A systems in the present specification, the embodiments of the present invention are applicable to any communication system corresponding to the above definition. In addition, although the embodiments of the present invention are described based on FDD in the present specification, the embodiments of the present invention may be easily modified and applied to H-FDD or TDD.

The term "eNB" can be used as a comprehensive term including a remote radio head (RRH), a transmission point (TP), a reception point (RP), a relay and the like.

Figure 1:
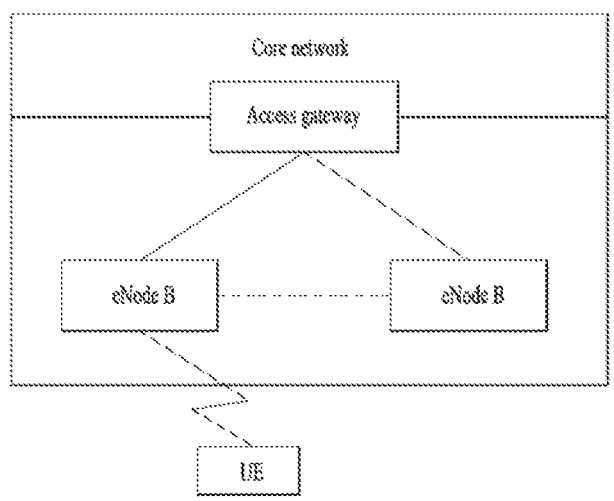
FIG. 1 illustrates a network structure of an E-UMTS as an exemplary wireless communication system.
Figure 2:
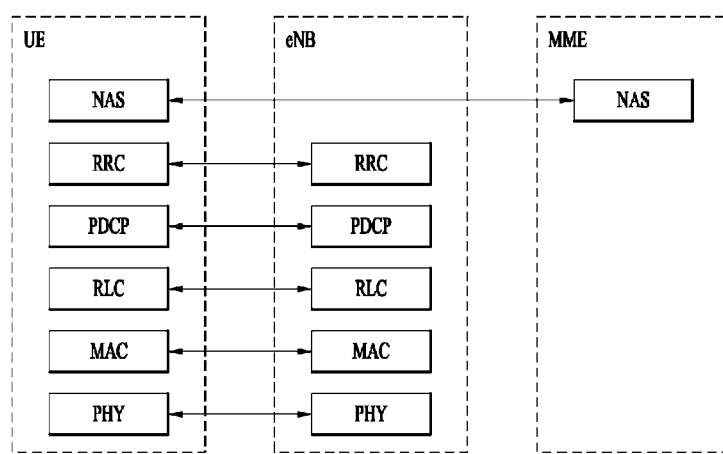
FIG. 2 illustrates control-plane and user-plane protocol stacks in a radio interface protocol between a UE and an E-UTRAN based on 3GPP wireless access network standards.
Figure 2:
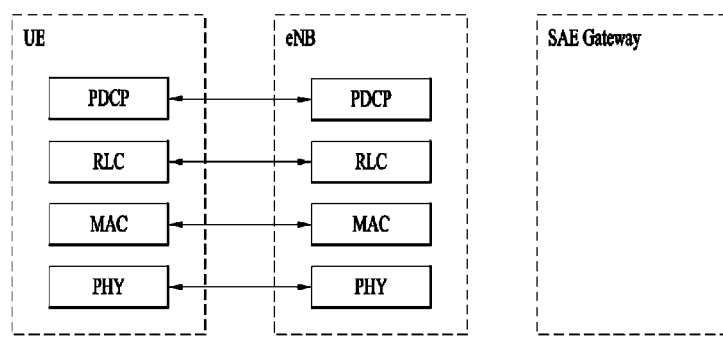

FIG. 2 illustrates control-plane and user-plane protocol stacks in a radio interface protocol architecture conforming to a 3GPP wireless access network standard between a User Equipment (UE) and an Evolved UMTS Terrestrial Radio Access Network (E-UTRAN). The control plane is a path in which the UE and the E-UTRAN transmit control messages to manage calls, and the user plane is a path in which data generated from an application layer, for example, voice data or Internet packet data is transmitted.

A PHYsical (PHY) layer at Layer 1 (L1) provides information transfer service to its higher layer, a Medium Access Control (MAC) layer. The PHY layer is connected to the MAC layer via transport channels. The transport channels deliver data between the MAC layer and the PHY layer. Data is transmitted on physical channels between the PHY layers of a transmitter and a receiver. The physical channels use time and frequency as radio resources. Specifically, the physical channels are modulated in Orthogonal Frequency Division Multiple Access (OFDMA) for Downlink (DL) and in Single Carrier Frequency Division Multiple Access (SC-FDMA) for Uplink (UL).

The MAC layer at Layer 2 (L2) provides service to its higher layer, a Radio Link Control (RLC) layer via logical channels. The RLC layer at L2 supports reliable data transmission. RLC functionality may be implemented in a function block of the MAC layer. A Packet Data Convergence Protocol (PDCP) layer at L2 performs header compression to reduce the amount of unnecessary control information and thus efficiently transmit Internet Protocol (IP) packets such as IP version 4 (IPv4) or IP version 6 (IPv6) packets via an air interface having a narrow bandwidth.

A Radio Resource Control (RRC) layer at the lowest part of Layer 3 (or L3) is defined only on the control plane. The RRC layer controls logical channels, transport channels, and physical channels in relation to configuration, reconfiguration, and release of radio bearers. A radio bearer refers to a service provided at L2, for data transmission between the UE and the E-UTRAN. For this purpose, the RRC layers of the UE and the E-UTRAN exchange RRC messages with each other. If an RRC connection is established between the UE and the E-UTRAN, the UE is in RRC Connected mode and otherwise, the UE is in RRC Idle mode. A Non-Access Stratum (NAS) layer above the RRC layer performs functions including session management and mobility management.

One cell constituting a base station (eNB) is configured to use one of bandwidths of 1.4, 3, 5, 10, 15, and 20 MHz to provide a downlink (DL) or uplink (UL) transmission service to multiple UEs. Different cells may be configured to provide different bandwidths.

As downlink transport channels carrying data from a network to a user equipment, there are provided a broadcast channel (BCH) carrying system information, a paging channel (PCH) carrying paging message, and a downlink shared channel (SCH) carrying user traffic or control messages. Traffic or control messages of a downlink multicast or broadcast service may be transmitted via the downlink SCH or an additional downlink multicast channel (MCH). Meanwhile, as uplink transport channels carrying data from the user equipment to the network, there are provided a random access channel (RACH) carrying an initial control message and an uplink shared channel (UL-SCH) carrying user traffic or control message. As logical channels located above the transport channels and mapped with the transport channels, there are provided a broadcast control channel (BCCH), a paging control channel (PCCH), a common control channel (CCCH), a multicast control channel (MCCH), and a multicast traffic channel (MTCH).

Figure 3:
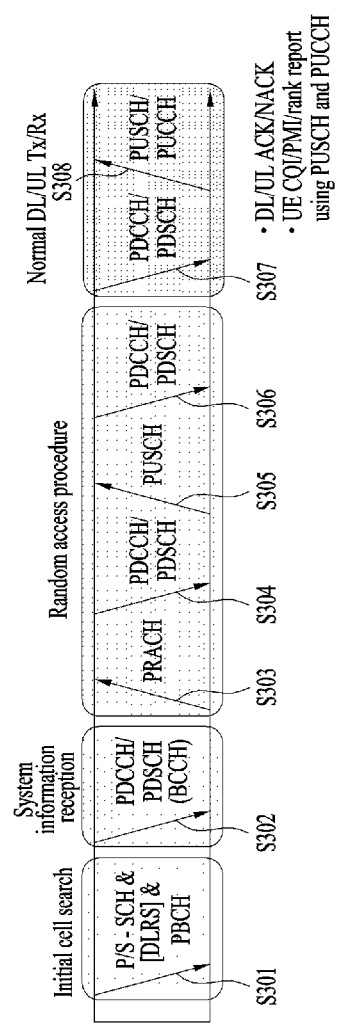
FIG. 3 illustrates physical channels used in 3GPP and a general method for transmitting signals using the physical channels.

FIG. 3 illustrates physical channels and a general method for transmitting signals on the physical channels in the 3GPP system.

Referring to FIG. 3, when a UE is powered on or enters a new cell, the UE performs initial cell search (S301). The initial cell search involves acquisition of synchronization to an eNB. Specifically, the UE synchronizes its timing to the eNB and acquires a cell Identifier (ID) and other information by receiving a Primary Synchronization Channel (P-SCH) and a Secondary Synchronization Channel (S-SCH) from the eNB. Then the UE may acquire information broadcast in the cell by receiving a Physical Broadcast Channel (PBCH) from the eNB. During the initial cell search, the UE may monitor a DL channel state by receiving a DownLink Reference Signal (DL RS).

After the initial cell search, the UE may acquire detailed system information by receiving a Physical Downlink Control Channel (PDCCH) and receiving a Physical Downlink Shared Channel (PDSCH) based on information included in the PDCCH (S302).

If the UE initially accesses the eNB or has no radio resources for signal transmission to the eNB, the UE may perform a random access procedure with the eNB (S303 to S306). In the random access procedure, the UE may transmit a predetermined sequence as a preamble on a Physical Random Access Channel (PRACH) (S303 and S305) and may receive a response message to the preamble on a PDCCH and a PDSCH associated with the PDCCH (S304 and S306). In the case of a contention-based RACH, the UE may additionally perform a contention resolution procedure.

After the above procedure, the UE may receive a PDCCH and/or a PDSCH from the eNB (S307) and transmit a Physical Uplink Shared Channel (PUSCH) and/or a Physical Uplink Control Channel (PUCCH) to the eNB (S308), which is a general DL and UL signal transmission procedure. Particularly, the UE receives Downlink Control Information (DCI) on a PDCCH. Herein, the DCI includes control information such as resource allocation information for the UE. Different DCI formats are defined according to different usages of DCI.

Control information that the UE transmits to the eNB on the UL or receives from the eNB on the DL includes a DL/UL ACKnowledgment/Negative ACKnowledgment (ACK/NACK) signal, a Channel Quality Indicator (CQI), a Precoding Matrix Index (PMI), a Rank Indicator (RI), etc. In the 3GPP LTE system, the UE may transmit control information such as a CQI, a PMI, an RI, etc. on a PUSCH and/or a PUCCH.

Figure 4:
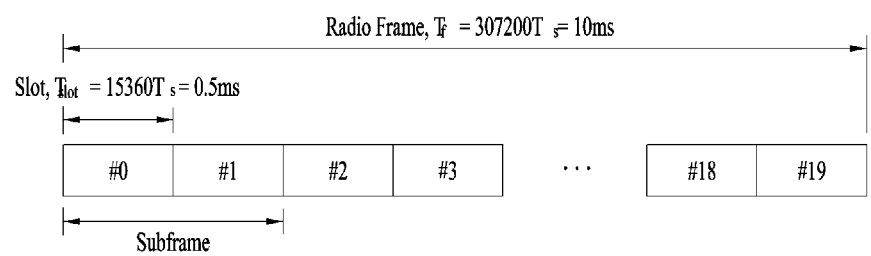
FIG. 4 illustrates a radio frame structure used in LTE.

FIG. 4 illustrates a radio frame structure used in LTE.

Referring to FIG. 4, a radio frame has a duration of 10 ms (327200×Ts) and is composed of 10 subframes of equal size. Each subframe is 1 ms in duration and consists of 2 slots. Each slot is 0.5 ms (15360×Ts) in duration. Here, Ts is sampling time and is represented by $Ts=1/(15\ kHz \times 2048) = 3.2552 \times 10^{-8}$ (about 33 ns). A slot includes a plurality of OFDM symbols in the time domain and includes a plurality of resource blocks (RBs) in the frequency domain. In LTE, one RB includes 12 subcarrier×7(6) OFDM symbols. A transmit time interval (TTI), a unit time for which data is transmitted, can be determined as one or more subframes. The above-described radio frame structure is exemplary and the number of subframes included in a radio frame, the number of slots included in a subframe and the number of OFDM symbols included in a slot can be varied.

Figure 5:
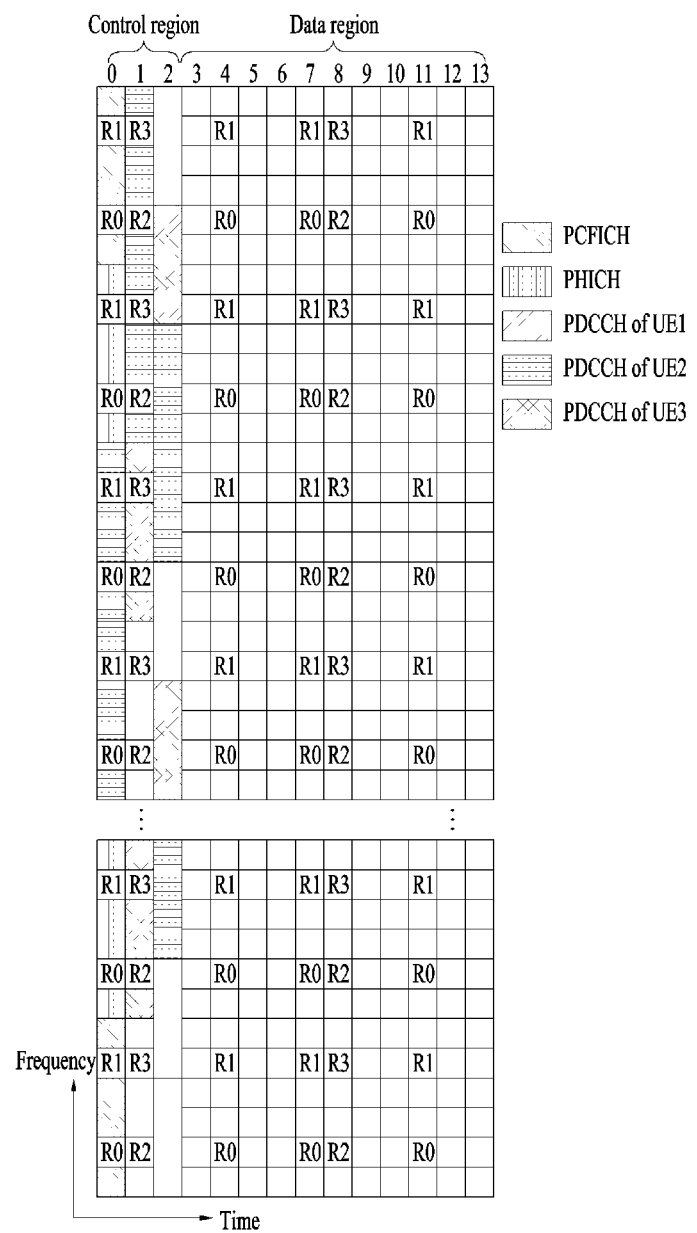
FIG. 5 illustrates a downlink radio frame structure used in LTE.

FIG. 5 illustrates control channels included in a control region of one subframe in a downlink radio frame.

Referring to FIG. 5, the subframe includes 14 OFDM symbols. First one to three OFDM symbols are used for the control region and the remaining thirteen to eleven OFDM symbols are used for a data region according to subframe configuration. In the figure, R1 to R4 indicate reference signals (RSs) or pilot signals for antennas 0 to 3. The RSs are fixed in a specific pattern in the subframe irrespective of the control region and the data region. Control channels are allocated to resources to which the RSs are not assigned in the control region, and traffic channels are also allocated to resources to which RSs are not assigned. The control channels allocated to the control region include a physical control format indicator channel (PCFICH), a physical hybrid-ARQ indicator channel (PHICH) and a physical downlink control channel (PDCCH).

The PCFICH, a physical control format indicator channel, indicates the number of OFDM symbols used for a PDCCH per subframe to a UE. The PCFICH is located in the first OFDM symbol and configured prior to the PHICH and the PDCCH. The PCFICH is composed of 4 resource element groups (REGs) which are distributed in the control region on the basis of a cell ID. One REG is composed of 4 resource elements (REs). An RE indicates a minimum physical resource defined by one subcarrier×one OFDM symbol. PCFICH values indicate 1 to 3 or 2 to 4 according to bandwidth and are modulated according to quadrature phase shift keying (QPSK).

The PHICH, a physical hybrid automatic repeat and request (HARQ) indicator channel, is used to carry HARQ ACK/NACK for uplink transmission. That is, the PHICH indicates a channel on which DL ACK/NACK information for UL HARQ is transmitted. The PHICH is composed of one REG and is cell-specifically scrambled. ACK/NACK is indicated by 1 bit and modulated according to binary phase shift keying (BPSK). Modulated ACK/NACK is spread with a spreading factor (SF) of 2 or 4. A plurality of PHICHs mapped to the same resource forms a PHICH group. The number of PHICHs multiplexed to the PHICH group is determined by the number of SFs. The PHICH (group) is repeated three times in the frequency domain and/or the time domain in order to obtain a diversity gain.

The PDCCH, a physical downlink control channel, is allocated to first n OFDM symbols of a subframe. Here, n is an integer equal to or greater than 1 and is indicated by a PCFICH. The PDCCH is composed of one or more CCEs. The PDCCH delivers information about resource allocation of a paging channel (PCH) and a downlink-shared channel (DL-SCH) which are transport channels, an uplink scheduling grant, HARQ information and the like to each UE or UE group. The PCH and the DL-SCH are transmitted through a PDSCH. Accordingly, an eNB and a UE generally transmit and receive data through the PDSCH except specific control information or specific service data.

Information about a UE (one or more UEs) to which PDSCH data is transmitted and information about how the UEs receive and decode the PDSCH data are included in a PDCCH and transmitted. For example, it is assumed that a specific PDCCH is CRC-masked with a radio network temporary identity (RNTI) of "A", and information about data transmitted using a radio resource (e.g. frequency position) of "B" and a DCI format, that is, transmission format information (e.g., transport block size, modulation scheme, coding information and the like) of "C" is transmitted through a specific subframe. In this case, a UE in a cell monitors, that is, blind decodes a PDCCH in a search space using RNTI information that the UE has. If one or more UEs having the RNTI of "A" are present, the UEs receive the PDCCH and receive a PDSCH indicated by "B" and "C" through information of the received PDCCH.

Figure 6:
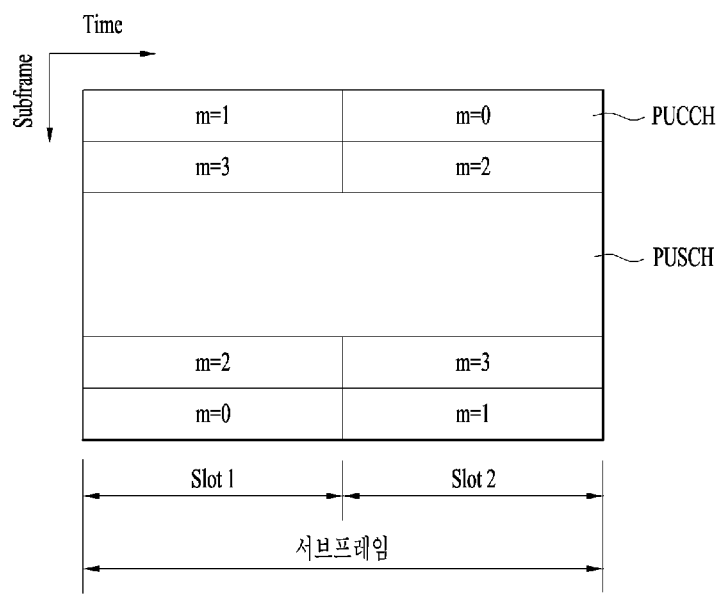
FIG. 6 illustrates an uplink radio frame structure used in LTE.

FIG. 6 illustrates an uplink subframe structure used in LTE.

Referring to FIG. 6, an uplink subframe can be divided into a region to which a physical uplink control channel (PUCCH) carrying control information is allocated and a region to which a physical uplink shared channel (PUSCH) carrying user data is allocated. The middle part of the subframe is allocated to the PUSCH and both sides of the data region in the frequency domain are allocated to the PUCCH. Control information transmitted on a PUCCH includes ACK/NACK used for HARQ, a channel quality indicator (CQI) indicating a downlink channel state, a rank indicator (RI) for MIMO, and a scheduling request (SR) corresponding to an uplink resource allocation request. A PUCCH for one UE uses one resource block which occupies different frequencies in respective slots in a subframe. That is, two resource blocks allocated to the PUCCH are frequency hopped at a slot boundary. Particularly, FIG. 6 illustrates allocation of a PUCCH with m=0, a PUCCH with m=1, a PUCCH with m=2 and a PUCCH with m=3 to a subframe.

A description will be given of a MIMO system. MIMO (Multiple-Input Multiple-Output), which is a method using a plurality of transmit antennas and a plurality of receive antennas, can improve data transmission/reception efficiency. That is, it is possible to increase capacity and to enhance performance by using a plurality of antennas at a transmitter or a receiver of a wireless communication system. MIMO can be referred to as "Multi-antenna" in the present specification.

In multi-antenna technology, one message is not received through a single antenna path. Multi-antenna technology forms data by aggregating data fragments received through multiple antennas. It is possible to improve a data throughput in a cell area of a specific size or to increase system coverage while securing a specific data throughput using the multi-antenna technology. In addition, multi-antenna technology can be widely used for mobile communication UEs and relays. According to the multi-antenna technology, throughput limitation in conventional mobile communication using a single antenna can be solved.

Figure 7:
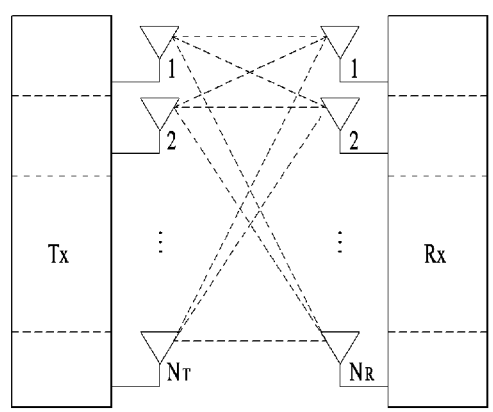
FIG. 7 illustrates a configuration of a general MIMO communication system.

A conventional MIMO communication system is shown in FIG. 7.

$N_T$ transmit antennas are provided to a transmitter and $N_R$ receive antennas are provided to a receiver. When both the transmitter and the receiver use a plurality of antennas, a theoretical channel transmission capacity is increased, compared to use of a plurality of antennas at only one of the transmitter and the receiver. The channel transmission capacity is increased in proportion to the number of antennas. Therefore, transmission rate and frequency efficiency can be increased. Given a maximum transmission rate $R_o$ that may be achieved with a single antenna, the transmission rate may be increased, in theory, to the product of $R_o$ and a transmission rate increase rate $R_i$ illustrated in Equation 1 due to an increase in channel transmission capacity in case of multiple antennas.

$$R_i = \min(N_T, N_R) \quad \text{[Equation 1]}$$

For instance, a MIMO communication system using 4 Tx antennas and 4 Rx antennas may theoretically achieve a four-fold increase in transmission rate, relative to a single-antenna system. After the above-mentioned theoretical capacity increase of the MIMO system was demonstrated in the mid-1990s, many developers began to conduct intensive research into a variety of technologies which can substantially increase data throughput using the theoretical capacity increase. Some of the above technologies have been reflected in a variety of wireless communication standards, for example, third-generation mobile communication or next-generation wireless LAN, etc.

A variety of MIMO-associated technologies have been intensively researched by many companies and developers, for example, research into information theory associated with MIMO communication capacity under various channel environments or multiple access environments, research into radio frequency (RF) channel measurement and modeling of the MIMO system, and research into space-time signal processing technology.

Mathematical modeling of a communication method for use in the MIMO system will hereinafter be described in detail. It is assumed that there are $N_T$ Tx antennas and $N_R$ Rx antennas, as shown in FIG. 7. In the case of a transmission signal, a maximum number of transmission information is $N_T$ under the condition that $N_T$ Tx antennas are used. The transmission information can be represented as follows.

$$s = [s_1, s_2, \ldots, s_{N_T}] \quad \text{[Equation 2]}$$

Individual transmission information $s_1, s_2, \ldots, s_{N_T}$ may have different transmission powers. In this case, if the individual transmission powers are denoted by $P_1, P_2, \ldots, P_{N_T}$, then transmission information having an adjusted transmission power can be represented as follows.

$$\hat{s} = [\hat{s}_1, \hat{s}_2, \ldots, \hat{s}_{N_T}]^T = [P_1 s_1, P_2 s_2, \ldots, P_{N_T} s_{N_T}]^T \quad \text{[Equation 3]}$$

In Equation 3, $\hat{S}$ can be represented by the following equation using a diagonal matrix P of a transmission power.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Equation 4]}$$

The information vector $\hat{S}$ having an adjusted transmission power is applied to a weight matrix W, so that $N_T$ transmitted signals $x_1, x_2, \ldots, x_{N_T}$ to be actually transmitted are configured. In this case, the weight matrix is adapted to properly distribute transmission information to individual antennas according to transmission channel situations. The above-mentioned transmitted signals $x_1, x_2, \ldots, x_{N_T}$ can be represented by the following equation using the vector X. Here, $W_{ij}$ denotes a weight corresponding to i-th Tx antenna and j-th information. W represents a weight matrix or a precoding matrix.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{21} & w_{22} & \cdots & w_{2N_T} \\ \vdots & & \ddots & \\ w_{i1} & w_{i2} & \cdots & w_{iN_T} \\ \vdots & & \ddots & \\ w_{N_T 1} & w_{N_T 2} & \cdots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = W\hat{s} = WPs \quad \text{[Equation 5]}$$

A rank of a channel matrix is physically considered to be a maximum number of different information which can be transmitted on a given channel. Accordingly, the rank of the channel matrix is defined by a smaller number between the number of rows and the number of columns, in which the rows and the columns are independent of each other. Therefore, the matrix rank cannot be higher than the number of rows or columns. The rank of the channel matrix H, rank(H), is represented by the following equation.

$$\text{rank}(H) \leq \min(N_T, N_R) \quad \text{[Equation 6]}$$

Information transmitted using MIMO is defined as a "transmission stream" or simply "stream". The stream can be referred to as a "layer". The number of transmission streams cannot be greater than a channel rank corresponding to a maximum number of different information that can be transmitted. Accordingly, the channel matrix H can be represented by the following equation.

$$\text{\# of streams} \leq \text{rank}(H) \leq \min(N_T, N_R) \quad \text{[Equation 7]}$$

Here, "# of streams" indicates the number of streams. It is noted that one stream can be transmitted through one or more antennas.

Various methods for matching one or more streams to multiple antennas can be present. Such methods are described according to MIMO types. Transmission of one stream through multiple antennas can be regarded as space diversity and transmission of multiple streams through multiple antennas can be regarded as spatial multiplexing. A hybrid form of space diversity and space multiplexing is possible.

LTE-A, a next-generation mobile communication system standard, is expected to support a CoMP (Coordinated Multi Point) transmission scheme, which was not supported by legacy standards, for data throughput improvement. The CoMP transmission scheme refers to a transmission scheme in which two or more eNBs or cells cooperatively communicate with UEs in order to improve communication performance between UEs and eNBs (cells or sectors) located in a shadow area.

The CoMP transmission scheme can be classified into CoMP-Joint Processing (CoMP-JP) corresponding to cooperative MIMO through data sharing and CoMP-Coordinated Scheduling/beamforming (CoMP-CS/CB).

In the case of downlink, a UE can simultaneously instantaneously receive data from respective eNBs, which perform CoMP, according to CoMP-JP and improve reception performance by combining signals received from the eNBs (Joint Transmission; JT). In addition, a method by which one of eNBs which perform CoMP transmits data to the UE at specific timing can be considered (DPS: Dynamic Point Selection). According to CoMP-CS/CB, the UE can instantaneously receive data through beamforming via one eNB, that is, a serving eNB.

In the case of uplink, eNBs can simultaneously receive PUSCH signals from UEs (Joint Reception: JR) according to CoMP-JP. Only one eNB receives a PUSCH in CoMP-CS/CB. Here, use of CoMP-CS/CB is determined by coordinated cells (or eNBs).

A description will be given of downlink data channel transmission modes. 3GPP LTE, specifically, 3GPP TS 36.213, defines downlink data channel transmission modes as shown in Table 1. The transmission modes shown in Table 1 are set for a UE through higher layer signaling, that is, RRC signaling.

TABLE 1

| Transmission mode | DCI format | Transmission scheme of PDSCH corresponding to PDCCH |
|---|---|---|
| Mode 1 | DCI format 1A | Single-antenna port, port 0 |
|  | DCI format 1 | Single-antenna port, port 0 |
| Mode 2 | DCI format 1A | Transmit diversity |
|  | DCI format 1 | Transmit diversity |
| Mode 3 | DCI format 1A | Transmit diversity |
|  | DCI format 2A | Large delay CDD or Transmit diversity |
| Mode 4 | DCI format 1A | Transmit diversity |
|  | DCI format 2 | Closed-loop spatial multiplexing or Transmit diversity |
| Mode 5 | DCI format 1A | Transmit diversity |
|  | DCI format 1D | Multi-user MIMO |
| Mode 6 | DCI format 1A | Transmit diversity |
|  | DCI format 1B | Closed-loop spatial multiplexing using a single transmission layer |
| Mode 7 | DCI format 1A | If the number of PBCH antenna ports is one, Single-antenna port, port 0 is used, otherwise Transmit diversity |
|  | DCI format 1 | Single-antenna port, port 5 |
| Mode 8 | DCI format 1A | If the number of PBCH antenna ports is one, Single-antenna port, port 0 is used, otherwise Transmit diversity |
|  | DCI format 2B | Dual layer transmission, port 7 and 8 or single-antenna port, port 7 or 8 |
| Mode 9 | DCI format 1A | Non-MBSFN subframe: If the number of PBCH antenna ports is one, Single-antenna port, port 0 is used, otherwise Transmit diversity MBSFN subframe: Single-antenna port, port 7 |
|  | DCI format 2C | Up to 8 layer transmission, ports 7-14 or single-antenna port, port 7 or 8 |
| Mode 10 | DCI format 1A | Non-MBSFN subframe: If the number of PBCH antenna ports is one, Single-antenna port, port 0 is used, otherwise Transmit diversity MBSFN subframe: Single-antenna port, port 7 |
|  | DCI format 2D | Up to 8 layer transmission, ports 7-14 or single-antenna port, port 7 or 8 |

Referring to Table 1, 3GPP LTE defines the transmission modes and DCI formats corresponding thereto, that is, transmission mode based DCI formats. In addition, 3GPP LTE defines DCI format 1A for a fallback mode, which is applicable irrespective of transmission mode. As an exemplary operation with respect to transmission modes, when a UE detects DCI format 1B, shown in Table 1, from blind decoding of a PDCCH, the UE decodes a PDSCH on the assumption that the PDSCH has been transmitted according to closed-loop spatial multiplexing using a single layer.

In Table 1, transmission mode 10 refers to a downlink data channel transmission mode according to the aforementioned CoMP. For example, when a UE detects DCI format 2D from blind decoding of a PDCCH, the UE decodes a PDSCH on the assumption that the PDSCH is transmitted according to a multilayer transmission technique on the basis of antenna ports 7 to 14, that is, DM-RSs or decodes the PDSCH on the assumption that the PDSCH is transmitted according to a single antenna transmission technique based on DM-RS antenna port 7 or 8.

When DCI format 1A is detected from blind decoding of the PDCCH, a transmission mode depends on whether the corresponding subframe is an MBSFN subframe. For example, when the corresponding subframe is a non-MBSFN subframe, the PDSCH is decoded on the assumption that the PDSCH has been transmitted according to a single antenna transmission scheme based on a CRS of antenna port 0 or a CRS based transmission diversity technique. When the corresponding subframe is an MBSFN subframe, the PDSCH can be decoded on the assumption that single antenna transmission based on a DM-RS of antenna port 7 has been performed.

A reference signal will now be described in detail.

For channel measurement, a reference signal previously known to both a transmitter and a receiver is transmitted along with data from the transmitter to the receiver. Such a reference signal indicates a modulation scheme to enable demodulation in addition to channel measurement. The reference signal is divided into a dedicated reference signal (DRS) for an eNB and a specific UE, that is, a UE-specific reference signal, and a common reference signal or cell-specific reference signal (CRS) for all UEs in a cell. The CSI includes a reference signal used for a UE to measure CQI/PMI/RI and report the same to an eNB, which is referred to as a channel state information reference signal (CSI-RS).

Figure 8:
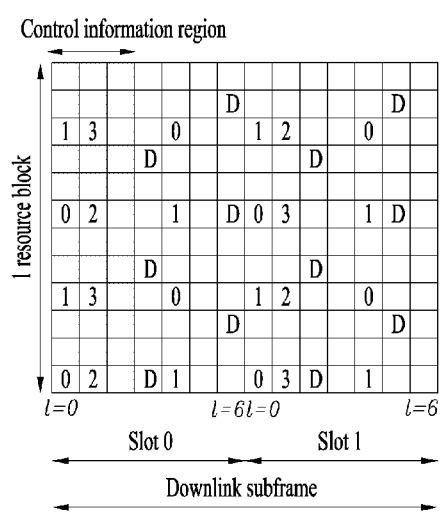
FIGS. 8 and 9 illustrate downlink reference signal structures in an LTE system supporting downlink transmission using 4 antennas.
Figure 9:
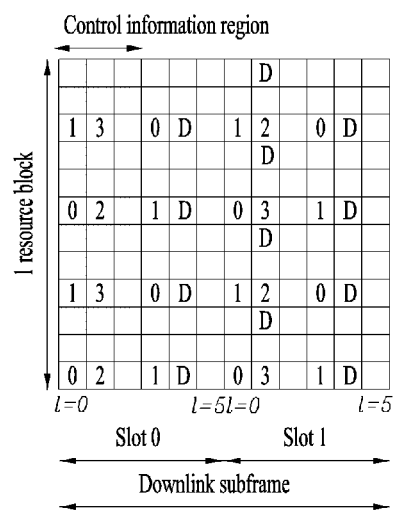

FIGS. 8 and 9 illustrate reference signal structures in an LTE system supporting downlink transmission using 4 antennas. Specifically, FIG. 8 illustrates a normal cyclic prefix (CP) case and FIG. 9 illustrates an extended CP case.

Referring to FIGS. 8 and 9, 0 to 3 indicated on the grid represent CRSs which are cell-specific reference signals transmitted for channel measurement and data demodulation, corresponding to antenna ports 0 to 3. The CRSs can be transmitted to a UE over a control information region as well as a data information region.

"D" indicated on the grid represents a demodulation reference signal (DM-RS) which is a UE-specific reference signal. The DM-RS supports single antenna port transmission through a data region, that is, a PDSCH. A higher layer signals presence or absence of the DM-RS to a UE. FIGS. 8 and 9 illustrate a DM-RS corresponding to antenna port 5. 3GPP standard document 36.211 also defines DM-RSs for 8 antenna ports 7 to 14.

Figure 10:
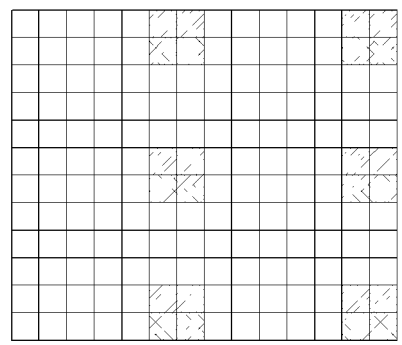
FIG. 10 illustrates exemplary downlink DM-RS allocation defined in the current 3GPP standard document.

FIG. 10 illustrates an example of downlink DM-RS allocation defined in 3GPP standard document.

Referring to FIG. 10, DM-RSs corresponding to antenna ports {7, 8, 11, 13} are mapped to DM-RS group 1 using a sequence per antenna port, and DM-RSs corresponding to antenna ports {9, 10, 12, 14} are mapped to DM-RS group 2 using a sequence per antenna port.

The aforementioned CSI-RS was proposed for channel measurement, separately from the CRS. The CSI-RS can be defined by 32 different resource configurations in order to reduce inter-cell interference (ICI) in a multi-cell environment, distinguished form the CRS.

Different CSI-RS (resource) configurations are set depending on the number of antenna ports. CSI-RSs are configured such that CSI-RSs defined by different (resource) configurations are transmitted between neighbor cells. The CSI-RS supports up to 8 antenna ports, differently from the CRS. 3GPP allocates 8 antenna ports 15 to 22 as antenna ports for the CSI-RS. The following tables 2 and 3 show CSI-RS configurations defined in 3GPP. Specifically, Table 2 shows a normal CP case and FIG. 3 shows an extended CP case.

TABLE 2

| CSI reference signal configuration | | Number of CSI reference signals configured | | | | | |
|---|---|---|---|---|---|---|---|
| | | 1 or 2 | | 4 | | 8 | |
| | | (k', l') | $n_s$ mod 2 | (k', l') | $n_s$ mod 2 | (k', l') | $n_s$ mod 2 |
| Frame structure type 1 and 2 | 0 | (9, 5) | 0 | (9, 5) | 0 | (9, 5) | 0 |
| | 1 | (11, 2) | 1 | (11, 2) | 1 | (11, 2) | 1 |
| | 2 | (9, 2) | 1 | (9, 2) | 1 | (9, 2) | 1 |
| | 3 | (7, 2) | 1 | (7, 2) | 1 | (7, 2) | 1 |
| | 4 | (9, 5) | 1 | (9, 5) | 1 | (9, 5) | 1 |
| | 5 | (8, 5) | 0 | (8, 5) | 0 | | |
| | 6 | (10, 2) | 1 | (10, 2) | 1 | | |
| | 7 | (8, 2) | 1 | (8, 2) | 1 | | |
| | 8 | (6, 2) | 1 | (6, 2) | 1 | | |
| | 9 | (8, 5) | 1 | (8, 5) | 1 | | |
| | 10 | (3, 5) | 0 | | | | |
| | 11 | (2, 5) | 0 | | | | |
| | 12 | (5, 2) | 1 | | | | |
| | 13 | (4, 2) | 1 | | | | |
| | 14 | (3, 2) | 1 | | | | |
| | 15 | (2, 2) | 1 | | | | |
| | 16 | (1, 2) | 1 | | | | |
| | 17 | (0, 2) | 1 | | | | |
| | 18 | (3, 5) | 1 | | | | |
| | 19 | (2, 5) | 1 | | | | |
| Frame structure type 2 only | 20 | (11, 1) | 1 | (11, 1) | 1 | (11, 1) | 1 |
| | 21 | (9, 1) | 1 | (9, 1) | 1 | (9, 1) | 1 |
| | 22 | (7, 1) | 1 | (7, 1) | 1 | (7, 1) | 1 |
| | 23 | (10, 1) | 1 | (10, 1) | 1 | | |
| | 24 | (8, 1) | 1 | (8, 1) | 1 | | |
| | 25 | (6, 1) | 1 | (6, 1) | 1 | | |
| | 26 | (5, 1) | 1 | | | | |
| | 27 | (4, 1) | 1 | | | | |
| | 28 | (3, 1) | 1 | | | | |
| | 29 | (2, 1) | 1 | | | | |
| | 30 | (1, 1) | 1 | | | | |
| | 31 | (0, 1) | 1 | | | | |

TABLE 3

| CSI reference signal configuration | | Number of CSI reference signals configured | | | | | |
|---|---|---|---|---|---|---|---|
| | | 1 or 2 | | 4 | | 8 | |
| | | (k', l') | $n_s$ mod 2 | (k', l') | $n_s$ mod 2 | (k', l') | $n_s$ mod 2 |
| Frame structure type 1 and 2 | 0 | (11, 4) | 0 | (11, 4) | 0 | (11, 4) | 0 |
| | 1 | (9, 4) | 0 | (9, 4) | 0 | (9, 4) | 0 |
| | 2 | (10, 4) | 1 | (10, 4) | 1 | (10, 4) | 1 |
| | 3 | (9, 4) | 1 | (9, 4) | 1 | (9, 4) | 1 |
| | 4 | (5, 4) | 0 | (5, 4) | 0 | | |
| | 5 | (3, 4) | 0 | (3, 4) | 0 | | |
| | 6 | (4, 4) | 1 | (4, 4) | 1 | | |
| | 7 | (3, 4) | 1 | (3, 4) | 1 | | |
| | 8 | (8, 4) | 0 | | | | |
| | 9 | (6, 4) | 0 | | | | |
| | 10 | (2, 4) | 0 | | | | |
| | 11 | (0, 4) | 0 | | | | |
| | 12 | (7, 4) | 1 | | | | |
| | 13 | (6, 4) | 1 | | | | |
| | 14 | (1, 4) | 1 | | | | |
| | 15 | (0, 4) | 1 | | | | |
| Frame structure type 2 only | 16 | (11, 1) | 1 | (11, 1) | 1 | (11, 1) | 1 |
| | 17 | (10, 1) | 1 | (10, 1) | 1 | (10, 1) | 1 |
| | 18 | (9, 1) | 1 | (9, 1) | 1 | (9, 1) | 1 |
| | 19 | (5, 1) | 1 | (5, 1) | 1 | | |
| | 20 | (4, 1) | 1 | (4, 1) | 1 | | |
| | 21 | (3, 1) | 1 | (3, 1) | 1 | | |
| | 22 | (8, 1) | 1 | | | | |
| | 23 | (7, 1) | 1 | | | | |
| | 24 | (6, 1) | 1 | | | | |
| | 25 | (2, 1) | 1 | | | | |

TABLE 3-continued

| CSI reference signal configuration | Number of CSI reference signals configured | | | | | |
|---|---|---|---|---|---|---|
| | 1 or 2 | | 4 | | 8 | |
| | (k', l') | $n_s$ mod 2 | (k', l') | $n_s$ mod 2 | (k', l') | $n_s$ mod 2 |
| 26 | (1, 1) | 1 | | | | |
| 27 | (0, 1) | 1 | | | | |

Figure 11:
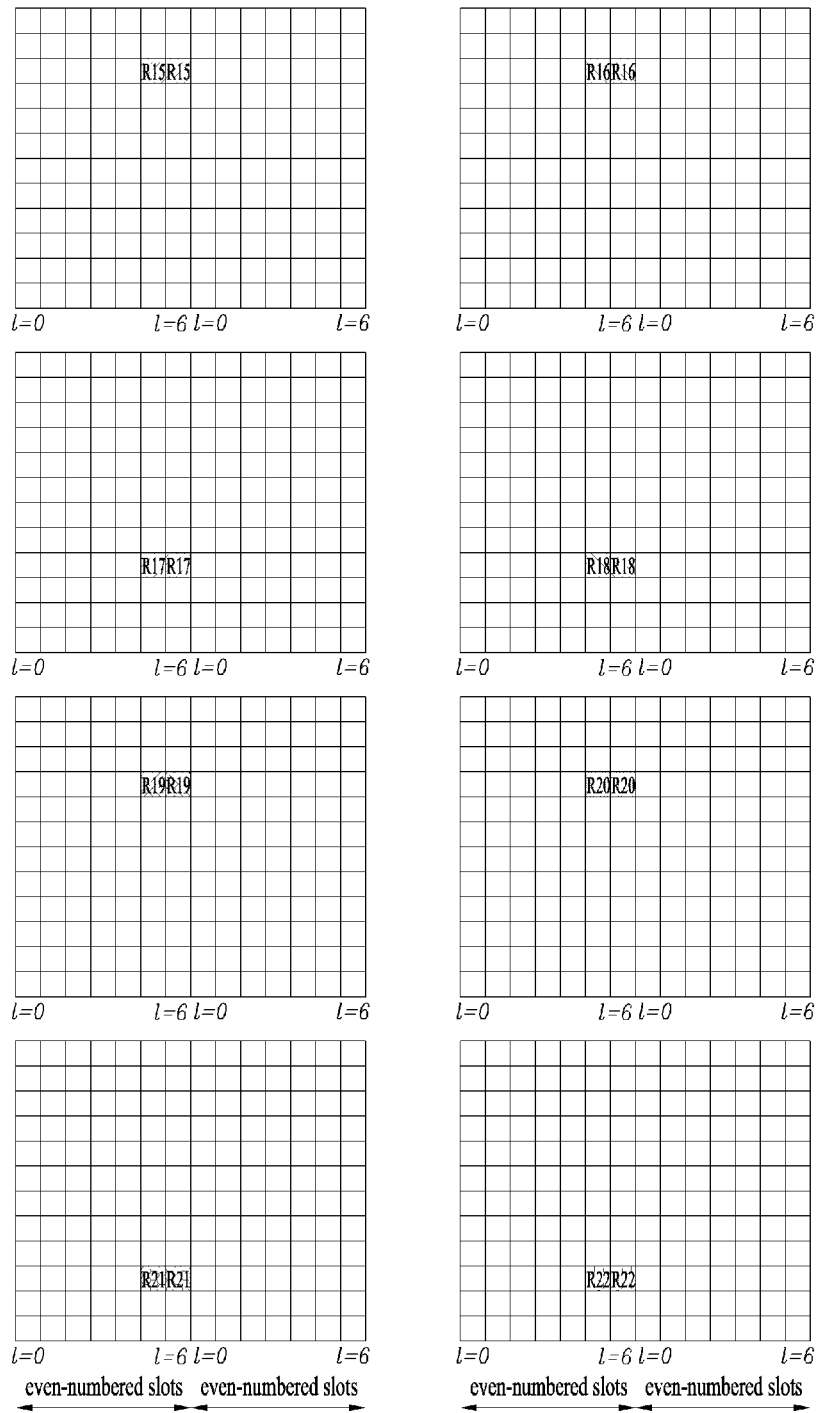
FIG. 11 illustrates CSI-RS configuration #0 in a normal CP case from among downlink CSI-RS configurations defined in the current 3GPP standard document.

In Tables 2 and 3 (k',l') indicates an RE index, k' indicates a subcarrier index and l' indicates an OFDM symbol index. FIG. 11 illustrates CSI-RS configuration #0 in a normal CP case, from among CSI-RS configurations defined by 3GPP standard document.

A CSI-RS subframe configuration can be defined. The CSI-RS subframe configuration is composed of periodicity $T_{CSI-RS}$ represented per subframe and a subframe offset $\Delta_{CSI-RS}$. The following table 4 shows CSI-RS subframe configurations defined by 3GPP standard document.

TABLE 4

| CSI-RS-SubframeConfig $I_{CSI-RS}$ | CSI-RS periodicity $T_{CSI-RS}$ (subframes) | CSI-RS subframe offset $\Delta_{CSI-RS}$ (subframes) |
|---|---|---|
| 0-4 | 5 | $I_{CSI-RS}$ |
| 5-14 | 10 | $I_{CSI-RS}$ - 5 |
| 15-34 | 20 | $I_{CSI-RS}$ - 15 |
| 35-74 | 40 | $I_{CSI-RS}$ - 35 |
| 75-154 | 80 | $I_{CSI-RS}$ - 75 |

Information about a ZP (zero-power) CSI-RS is configured through RRC layer signaling. Particularly, a ZP CSI-RS resource configuration is composed of zeroTxPowerSubframeConfig and a 16-bit bitmap zeroTxPowerResourceConfigList. Here, zeroTxPowerSubframeConfig indicates the periodicity and subframe offset in which the corresponding ZP CSI-RS is transmitted through a value $I_{CSI-RS}$ shown in Table 3. In addition, zeroTxPowerResourceConfigList is information indicating a ZP CSI-RS configuration and elements of the bitmap respectively indicate configurations included in the column corresponding to 4 antenna ports in Table 2 or 3. A normal CSI-RS other than the ZP CSI-RS is referred to as a non zero-power (NZP) CSI-RS.

When the aforementioned CoMP is applied, a plurality of CSI-RS configurations can be set for a UE through RRC layer signaling. Each CSI-RS is defined as shown in the following table 5. Referring to Table 5, each CSI-RS configuration includes information about a CRS for which quasi-co-location (QCL) can be assumed.

TABLE 5

CSI-RS-ConfigNZP information elements

```
-- ASN1START
CSI-RS-ConfigNZP-r11 ::=       SEQUENCE {
    csi-RS-ConfigNZPId-r11         CSI-RS-ConfigNZPId-r11,
    antennaPortsCount-r11          ENUMERATED {an1, an2, an4, an8},
    resourceConfig-r11             INTEGER (0..31),
    subframeConfig-r11             INTEGER (0..154),
    scramblingIdentity-r11         INTEGER (0..503),
    qcl-CRS-Info-r11               SEQUENCE {
        qcl-ScramblingIdentity-r11     INTEGER (0..503),
        crs-PortsCount-r11             ENUMERATED {n1, n2, n4, spare1},
        mbsfn-SubframeConfigList-r11   CHOICE {
            release                        NULL,
            setup                          SEQUENCE {
                subframeConfigList             MBSFN-SubframeConfigList
            }
        }                                                                   OPTIONAL    -- Need ON
    }                                                                       OPTIONAL,   -- Need OR
    ...
}
-- ASN1STOP
```

3GPP LTE-A defines a PDSCH RE mapping and quasi-co-location indicator (PQI) field in DCI format 2D for transmission mode 10 corresponding to PDSCH transmission in CoMP. Specifically, the PQI field is defined in a 2-bit size and indicates 4 states as shown in Table 6. Information indicated by the states are parameter sets for receiving a CoMP PDSCH and specific values thereof are pre-signaled through a higher layer. That is, 4 parameter sets can be semi-statically signaled through an RRC layer signal for Table 6. The PQI field of DCI format 2D dynamically indicates one of the 4 parameter sets.

TABLE 6

| Value of 'PDSCH RE Mapping and Quasi-Co-Location Indicator' field | Description |
|---|---|
| '00' | Parameter set 1 configured by higher layers |
| '01' | Parameter set 2 configured by higher layers |
| '10' | Parameter set 3 configured by higher layers |

TABLE 6-continued

| Value of 'PDSCH RE Mapping and Quasi-Co-Location Indicator' field | Description |
| --- | --- |
| '11' | Parameter set 4 configured by higher layers |

Information included in the parameter sets includes at least one of the number of CRS antenna ports (crs-Ports-Count), a frequency shift value of a CRS (crs-FreqShift), MBSFN subframe configuration (mbsfn-SubframeConfig-List), ZP CSI-RS configuration (csi-RS-ConfigZPId), PDSCH start symbol (pdsch-Start) and QCL (Quasi Co-Location) information of a non-ZP (NZP) CSI-RS (qcl-CSI-RS-ConfigNZPId).

A description will be given of quasi co-location (QCL).

QCL between antenna ports means that a UE can assume that all or some large-scale properties of a signal received from one antenna port (or a radio channel corresponding to the antenna port) are identical to those of a signal received from the other antenna port (or a radio channel corresponding to the antenna port). Here, the large-scale properties can include Doppler spread and Doppler shift related to a frequency offset and average delay and delay spread related to a timing offset and may further include average gain.

According to the above definition, the UE cannot assume that large-scale properties of non-quasi-co-located (NQCL) antenna ports are not identical. In this case, the UE needs to independently perform a tracking procedure to obtain a frequency offset and a timing offset per antenna port.

The UE can perform the following operations between quasi-co-located antenna ports.

1) The UE can equally apply power-delay profile, delay spread, Doppler spectrum and Doppler spread estimation results for a radio channel corresponding to a specific antenna port to a Wiener filter parameter and the like, used for channel estimation with respect to a radio channel corresponding to the other antenna port.

2) In addition, the UE can acquire time synchronization and frequency synchronization for the specific antenna port and then apply the same synchronizations to the other antenna port.

3) Finally, the UE can calculate reference signal received power (RSRP) measurement values for the quasi-co-located antenna ports as an average value for average gain.

For example, when the UE receives DM-RS based downlink data channel scheduling information, e.g., DCI format 2D, through a PDCCH, it is assumed that the UE performs channel estimation for a PDSCH through a DM-RS sequence indicated by the scheduling information and then performs data demodulation.

In this case, when a DM-RS antenna port for downlink data channel demodulation is quasi-co-located with a CRS antenna port of a serving cell, the UE can apply large-scale properties of a radio channel, which have been estimated from a CRS antenna port thereof, to channel estimation through the DM-RS antenna port so as to improve DM-RS based downlink data channel reception performance.

Similarly, when the DM-RS antenna port for downlink data channel demodulation is quasi-co-located with a CSI-RS antenna port of the serving cell, the UE can apply large-scale properties of a radio channel, which have been estimated from the CSI-RS antenna port of the serving cell, to channel estimation through the DM-RS antenna port so as to improve DM-RS based downlink data channel reception performance.

According to definition of LTE, an eNB sets one of QCL type A and QCL type B for a UE through higher layer signaling when a downlink signal is transmitted in transmission mode 10 corresponding to a CoMP mode.

Here, QCL type A assumes that large-scale properties, other than average gain, of CRS, CSI-RS and DM-RS antenna ports are quasi-co-located and means that physical channels and signals are transmitted from the same point.

QCL type B assumes that large-scale properties, other than average gain, of antenna ports for a DM-RS and a specifically indicated CSI-RS are quasi-co-located. Particularly, QCL type B is defined to set up to 4 QCL modes per UE through a higher layer message such that CoMP transmission such as DPS and JT can be performed and to dynamically set a QCL mode in which a downlink signal is received, through downlink control information (DCI). Such information is defined in qcl-CSI-RS-ConfigNZPId in the parameter sets of the PQI field.

A detailed description will be given of DPS transmission when QCL type B is set.

It is assumed that node #1 composed of N1 antenna ports transmits CSI-RS resource #1 and node #2 composed of N2 antenna ports transmits CSI-RS resource #2. In this case, CSI-RS resource #1 is included in parameter set #1 of the PQI field and CSI-RS resource #2 is included in parameter set #2 of the PQI field. Furthermore, the corresponding eNB signals parameter set #1 and parameter set #2 to a UE present in a common coverage of node #1 and node #2 through a higher layer.

The eNB can perform DPS in such a manner that the eNB sets parameter set #1 using DCI when transmitting data (i.e., PDSCH) to the corresponding UE through node #1 and sets parameter set #2 when transmitting data to the UE through node #2. The UE can assume that CSI-RS resource #1 and a DM-RS have been quasi-co-located when parameter set #1 is set therefor through the PQCI field using DCI and assume that CSI-RS resource #2 and the DM-RS have been quasi-co-located when parameter set #2 is set therefor through the PQI field.

A description will be given of an enhanced PDCCH (EPDCCH).

With the advent and propagation of machine-to-machine (M2M) communication and various devices requiring high data throughput, data throughput for cellular networks is rapidly increasing in the current wireless communication environment. To satisfy high data throughput, communication technology is developed into carrier aggregation technology for efficiently using more frequency bands and MIMO, CoMP and the like for increasing data capacity within a limited frequency, and communication environments evolve such that density of accessible nodes around a user increases. A system having high node density can exhibit higher system performance through cooperation between nodes. This system has much higher performance than when each node operates as an independent eNB (base station (BS), advanced BS (ABS), Node-B (NB), access point (AP) or the like) and thus nodes do not cooperate.

If transmission and reception of all nodes are managed by one controller and individual nodes operate as if they are an antenna group of one cell, this system can be regarded as a distributed multi-node system (DMNS) which forms one cell. Here, the individual nodes may be assigned additional node IDs or may operate like antennas in the cell without having the node IDs. However, if the nodes have different cell identifiers (IDs), the system can be regarded as a multi-cell system. When multiple cells are configured in an overlapping manner according to coverage, this is called a multi-tier network.

Introduction of the aforementioned multi-node system and relay node enables various communication schemes so as to improve channel quality. However, to apply the aforementioned MIMO and cooperative multipoint communication to multi-node environments, introduction of a new control channel is needed. Accordingly, introduction of an enhanced PDCCH (EPDCCH) as a new control channel is under discussion. The E-PDCCH is transmitted through a data region (referred to as a PDSCH region hereinafter) instead of a control region (referred to as a PDCCH region hereinafter).

Control information about a node can be transmitted per UE through the EPDCCH and thus a problem of lack of PDCCH region can be solved. For reference, the EPDCCH is not provided to legacy UEs and can be received by LTE-A UEs. In addition, the EPDCCH is transmitted and received on the basis of a DM-RS which is a UE-specific reference signal, instead of a CRS which is a cell-specific reference signal.

A description will be given of a method for actively cancelling, by a UE, interference from a neighbor cell with the aid of a network. Such an interference cancellation method is referred to as network assisted interference cancellation and suppression (NAICS).

Figure 12:
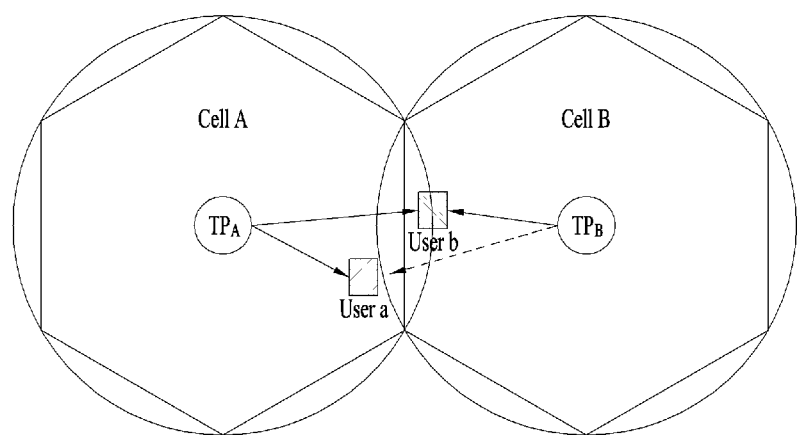
FIG. 12 illustrates a general interference environment of a downlink system to which the present invention is applied.

FIG. 12 illustrates a general interference environment of a downlink system to which the present invention is applied. It is assumed that a cell managed by TP #A is cell #A, a UE communicating with TP #A is UE #a, and that cell #B and UE #b are present for TP #B. Since cell #A and cell #B use the same radio resource, UE #b as a UE located at a cell boundary receives interference from cell #A.

In the following, cell #A is regarded as an interfering cell, TP #A is regarded as an interfering TP, cell #B is regarded as a serving cell, TP #B is regarded as a serving TP, and UE #b is defined as a UE performing interference cancellation, that is, an NAICS UE. UE #b corresponding to an NAICS UE can improve a data reception rate by cancelling an interference signal from the interfering cell.

To effectively cancel an interference signal, the NAICS UE needs to be previously aware of various parameters with respect to the interference signal. The NAICS UE needs to know interfering TP information and PDSCH information of the interfering TP shown in Table 7. In the following, the PDSCH of the interfering TP is represented as an interfering PDSCH (I-PDSCH) for convenience of description.

TABLE 7

| | |
|---|---|
| Independently from the TM used in Neighbour Cell (NC) | CFI |
| | MBSFN configuration |
| | RI |
| | CRS AP |
| | Cell ID |
| | Modulation Order |
| | MCS |
| | RNTI |
| | TM |
| If CRS TMs are used in NC | PMI |
| | Data to RS EPRE, PA, PB |
| | System bandwidth |
| | PDSCH allocation |
| If DM-RS TMs are used in NC | PDSCH bandwidth for DM-RS |
| | Data to RS EPRE, PB |
| | DM-RS APs |
| | nSCID |
| | CSI-RS presence and their pattern |
| | Virtual cell ID |

UE #b performs NAICS when interference from cell #A is present for a PDSCH reception resource thereof and performs data demodulation as in a conventional method when the interference is not present. That is, UE #b needs to recognize whether interference from cell #A is applied thereto first. A method for recognizing whether interference is applied to UE #b may depend on the transmission mode of cell #A.

For example, when cell #A, an interfering cell, performs downlink transmission using transmission mode 9 or 10 corresponding to a DM-RS based transmission mode, UE #b can recognize presence or absence of interference by detecting a DM-RS of cell #A. That is, UE #b generates a DM-RS sequence of cell #A, correlates the DM-RS sequence with a signal received through DM-RS REs, determines that interference from cell #A is applied thereto when the corresponding correlation value is large and determines that there is no interference from cell #A when the correlation value is small. Since presence or absence of a DM-RS is determined according to presence or absence of data in transmission modes 9 and 10, it is possible to recognize presence or absence of data interference through DM-RS detection.

The present invention considers supporting of dynamic signaling or semi-static signaling from the network such that the NAICS UE easily recognizes presence or absence of interference through DM-RS detection. More specifically, the present invention considers a method of transmitting DM-RS configuration information to the NAICS UE such that assisting DCI (A-DCI) in a new format is provided through a downlink control channel such as a PDCCH or EPDCCH from the interfering cell (or directly from the serving cell) and a DM-RS of an I-PDSCH can be detected through payload content of the A-DCI.

When neighbor cells which may apply interference to the NAICS UE have different cell IDs, A-DCI #j including information about an I-PDSCH transmitted from neighboring specific cell #j can be broadcast through a PDCCH of cell #j. When neighbor cells which may apply interference to the NAICS UE have the same cell ID, A-DCI #p including information about an I-PDSCH transmitted from neighboring specific TP #p can be broadcast through an EPDCCH from TP #p. The EPDCCH broadcast by TP #p can be irrelevant to EPDCCH configuration of the NAICS UE and belongs to EPDCCH configuration of a neighbor cell UE which intends to receive the I-PDSCH transmitted from TP #p.

To this end, the NAICS UE previously receives configuration information of the EPDCCH (for detecting A-DCI #p) broadcast by TP #p through higher layer signaling such as RRC signaling. In other words, the NAICS UE can receive one or more EPDCCH configurations of neighboring TPs in addition to at least two EPDCCH configurations provided by the serving cell thereof for NAICS operation, and the purpose of information about one or more EPDCCH configurations for NAICS may be limited to reception of A-DCI only.

To reduce complexity of EPDCCH configurations for NAICS, the number of blind decoding operations of the NAICS UE can be decreased through a method of limiting an aggregation level L for the corresponding EPDCCH search space to a specific value, for example, a low value such as 1 or 2, or to a high level such as 4, 8 or 16.

The EPDCCH configurations for NAICS, for the above purpose, may be limited to a distributed EPDCCH to which beamforming is not applied. This is because beamforming is applied to a localized EPDCCH and, when a control signal such as A-DCI is broadcast, application of beamforming is inappropriate.

Figure 13:
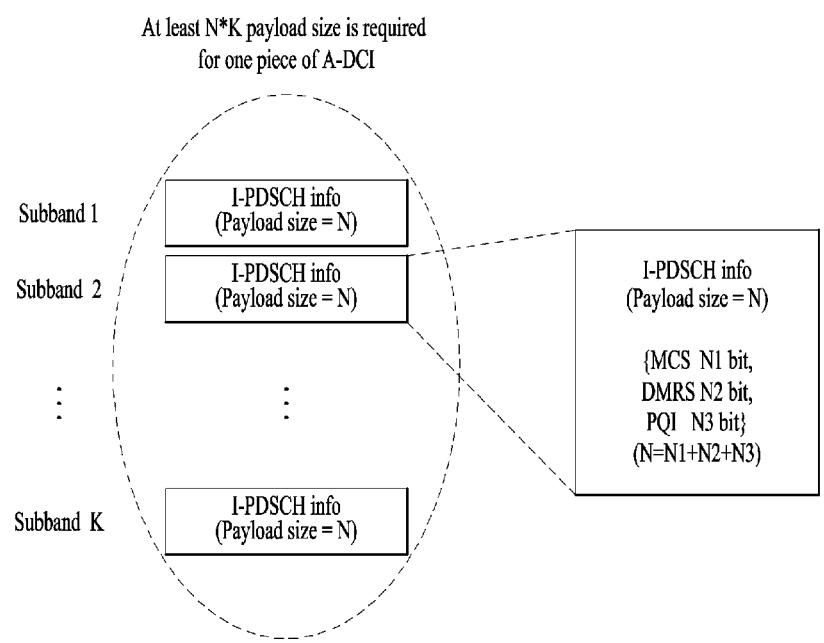
FIG. 13 illustrates payload content of A-DCI according to an embodiment of the present invention.

FIG. 13 illustrates payload content of A-DCI according to an embodiment of the present invention.

Referring to FIG. 13, payload content of A-DCI can be set per specific frequency such as subband, physical resource group (PRG) and physical resource block (PRB). In the following, it is assumed that I-PDSCH information is loaded on a payload per subband for convenience of description.

The A-DCI can be CRC-masked with a specific RNTI such as NAICS-RNTI and the specific RNTI can be previously provided to the NAICS UE through RRC signaling. The specific RNTI may be independently set for each of K subbands and/or per N-bit A-DCI payload.

In FIG. 13, information about an N-bit payload size of I-PDSCH information per subband, content of modulation and coding scheme (MCS) related N1 bits, DM-RS related N2 bits and PQI related N3 bits which constitute the N bits, and values of N1, N2 and N3 need to be previously provided to the NAICS UE through higher layer signaling such as RRC signaling. Examples of the higher layer signaling are shown in Table 8. However, the present invention considers symbol-level interference cancellation and thus information such as a coding rate is unnecessary. In Table 8, it is assumed that N is 7 bits and only an I-PDSCH of transmission mode 9 is present.

TABLE 8

| MCS N1 = 2 bits | DM-RS N2 = 3 bits |
|---|---|
| '00': QPSK | '000': 1 layer, port 7, nSCID = 0 |
| '01': 16QAM | '001': 1 layer, port 7, nSCID = 1 |
| '10': 64QAM | '010': 1 layer, port 8, nSCID = 0 |
| '11': Reserved (or 256QAM) | '011': 1 layer, port 8, nSCID = 1 |
| | '100': 2 layer, ports 7-8, nSCID = 0 |
| | '101': 2 layer, ports 7-8, nSCID = 1 |
| | '110': 3 layer, ports 7-9, (nSCID = 0) |
| | '111': Reserved |
| PQI N3 = 2 bits | |
| '00': ID_ZP-CSIRS_NAICS = 2, ID_QCLed_CSIRS_NAICS = 2, PDSCH_start = 3 | |
| '10': ID_ZP-CSIRS_NAICS = 2, ID_QCLed_CSIRS_NAICS = 2, PDSCH_start = 2 | |
| '11': ID_ZP-CSIRS_NAICS = 2, ID_QCLed_CSIRS_NAICS = 2, PDSCH_start = {PCFICH of serving cell}, | |
| '11': Reserved | |

When DM-RS N2 bits are set to 3 bits through RRC signaling as described above, as shown in Table 8, this can be interpreted as addition of restriction of transmission of the I-PDSCH up to rank 3. That is, an interfering cell can signal, to the serving cell, information indicating that the interfering cell will schedule an I-PDSCH within maximum rank 3 through X2-signaling, or the serving cell can request the aforementioned specific rank restriction to a specific interfering cell. Here, the interfering cell may accept or reject the request. Alternatively, the interfering cell may include a different maximum rank value in a response message to the request. If the serving cell is aware of a maximum rank of the interfering cell through negotiation between cells, the serving cell can configure appropriate DM-RS N2 bits and states corresponding thereto within the maximum rank, as shown in Table 8, and previously provide the same to the NAICS UE through RRC signaling.

As shown in Table 8, a PDSCH start symbol index (PDSCH_start) of the I-PDSCH, ZP CSI-RS rate matching information (ID_ZP-CSIRS_NAICS) about the I-PDSCH, and NZP CSI-RS information (ID_QCLed_CSIRS_NAICS) about the I-PDSCH, for which QCL can be assumed, which are indicated by the PQI having a size of N3=2 bits, can be RRC-configured as described above and provided to the NAICS UE. Accordingly, a specific state of the PQI N3 bits is dynamically indicated by the payload content of the A-DCI such that the NAICS UE can detect the I-PDSCH and perform SLIC.

Since it is assumed that the I-PDSCH is transmitted from the interfering cell (or interfering TP) using transmission mode 9 in Table 8, the number of CRS antenna ports (crs-PortsCount), CRS frequency shift value (crs-FreqShift) and MBSFN subframe information (ID_mbsfn-SubframeConfigList), from among the PQI parameters are omitted. This is because the NAICS UE has been provided with the physical cell ID (PCI) of the interfering cell through RRC signaling for A-DCI detection and has detected the A-DCI with a CRS sequence generated using the PCI of the interfering cell. Accordingly, as the omitted information, that is, the number of CRS antenna ports (crs-PortsCount), CRS frequency shift value (crs-FreqShift) and MBSFN subframe information (ID_mbsfn-SubframeConfigList), information of the interfering cell, detected through the PCI and CRS of the interfering cell, can be applied to I-PDSCH detection.

In addition, since ID_ZP-CSIRS_NAICS and ID_QCLed_CSIRS_NAICS are commonly configured in Table 8, such common information can be omitted. However, relation of the common information with the CRS of the interfering cell needs to be previously provided. Representative relation information may be CRS information for which QCL can be assumed in the case of an NZP CSI-RS. In the case of a ZP CSI-RS, relation information needs to be additionally configured.

Furthermore, UE operation in which information omitted in the PQI N3 bits conforms to information of a cell from which the corresponding A-DCI has been detected can be defined. The UE operation can be added to the aforementioned RRC signaling information such that whether the operation is applied can be additionally controlled through higher layer signaling.

For each of ID_ZP-CSIRS_NAICS and ID_QCLed_CSIRS_NAICS, ZP-CSI-RS configuration information and NZP-CSI-RS configuration information need to be provided to the NAICS UE through different RRC signaling.

An example including a case in which an I-PDSCH can be transmitted in transmission mode 10 is shown in Table 9. In Table 9, it is assumed that N is 10 bits and I-PDSCH transmission in transmission mode 9 and I-PDSCH transmission in transmission mode 10 coexist. In this case, information such as a coding rate is unnecessary since SLIC is considered.

TABLE 9

| MCS N1 = 2 bits |
|---|
| '00': QPSK |
| '01': 16QAM |
| '10': 64QAM |

TABLE 9-continued

'11': Reserved (or 256QAM)

DM-RS N2 = 5 bits

'00000': 1 layer, port 7, nSCID = 0, n^DM-RS_ID = 0
'00001': 1 layer, port 7, nSCID = 0, n^DM-RS_ID = 1
'00010': 1 layer, port 7, nSCID = 0, n^DM-RS_ID = 2
'00011': 1 layer, port 7, nSCID = 0, n^DM-RS_ID = 3
'00100': 1 layer, port 7, nSCID = 1, n^DM-RS_ID = 0
'00101': 1 layer, port 7, nSCID = 1, n^DM-RS_ID = 1
'00110': 1 layer, port 7, nSCID = 1, n^DM-RS_ID = 2
'00111': 1 layer, port 7, nSCID = 1, n^DM-RS_ID = 3
'01000': 1 layer, port 8, nSCID = 0, n^DM-RS_ID = 0
'01001': 1 layer, port 8, nSCID = 0, n^DM-RS_ID = 1
'01010': 1 layer, port 8, nSCID = 0, n^DM-RS_ID = 2
'01011': 1 layer, port 8, nSCID = 0, n^DM-RS_ID = 3
'01100': 1 layer, port 8, nSCID = 1, n^DM-RS_ID = 0
'01101': 1 layer, port 8, nSCID = 1, n^DM-RS_ID = 1
'01110': 1 layer, port 8, nSCID = 1, n^DM-RS_ID = 2
'01111': 1 layer, port 8, nSCID = 1, n^DM-RS_ID = 3
'10000': 2 layer, ports 7-8, nSCID = 0, n^DM-RS_ID = 0
'10001': 2 layer, ports 7-8, nSCID = 0, n^DM-RS_ID = 1
'10010': 2 layer, ports 7-8, nSCID = 0, n^DM-RS_ID = 2
'10011': 2 layer, ports 7-8, nSCID = 0, n^DM-RS_ID = 3
'10100': 2 layer, ports 7-8, nSCID = 1, n^DM-RS_ID = 0
'10101': 2 layer, ports 7-8, nSCID = 1, n^DM-RS_ID = 1
'10110': 2 layer, ports 7-8, nSCID = 1, n^DM-RS_ID = 2
'10111': 2 layer, ports 7-8, nSCID = 1, n^DM-RS_ID = 3
'11000': 3 layer, ports 7-9, (nSCID = 0), n^DM-RS_ID = 0
'11001': 3 layer, ports 7-9, (nSCID = 0), n^DM-RS_ID = 1
'11010': 3 layer, ports 7-9, (nSCID = 0), n^DM-RS_ID = 2
'11011': 3 layer, ports 7-9, (nSCID = 0), n^DM-RS_ID = 3
'11100': Reserved
'11101': Reserved
'11110': Reserved
'11111': Reserved PQI N3 = 3 bits '000': PDSCH_start = 1, ID_ZP-CSIRS_NAICS = 1, ID_QCLed_CSIRS_NAICS = 1, crs-PortsCount = 2, crs-FreqShift = 1, ID_mbsfn-SubframeConfigList = 1
'001': PDSCH_start = 1, ID_ZP-CSIRS_NAICS = 2, ID_QCLed_CSIRS_NAICS = 2, crs-PortsCount = 4, crs-FreqShift = 2, ID_mbsfn-SubframeConfigList = 2
'010': PDSCH_start = 1, ID_ZP-CSIRS_NAICS = 3, ID_QCLed_CSIRS_NAICS = 3, crs-PortsCount = 2, crs-FreqShift = 3, ID_mbsfn-SubframeConfigList = 3
'011': PDSCH_start = 2, ID_ZP-CSIRS_NAICS = 1, ID_QCLed_CSIRS_NAICS = 1, crs-PortsCount = 2, crs-FreqShift = 1, ID_mbsfn-SubframeConfigList = 1
'100': PDSCH_start = 2, ID_ZP-CSIRS_NAICS = 2, ID_QCLed_CSIRS_NAICS = 2, crs-PortsCount = 4, crs-FreqShift = 2, ID_mbsfn-SubframeConfigList = 2
'101': PDSCH_start = 2, ID_ZP-CSIRS_NAICS = 3, ID_QCLed_CSIRS_NAICS = 3, crs-PortsCount = 2, crs-FreqShift = 3, ID_mbsfn-SubframeConfigList = 3
'110': Reserved
'111': Reserved Table 9 in which DM-RS N2 bits are set to 5 bits can be considered as an embodiment in which restriction of transmission of the I-PDSCH up to rank 3 is signaled by the interfering cell. Table 9 differs from Table 8 in that respective states defined by N2 bits differently indicate which one of {0, 1, 2, 3} corresponds to n^DM-RS_ID. Here, n^DM-RS_ID indicates a DM-RS sequence scrambling initial value parameter in the range of 0 to 503. To this end, a correct initial value parameter is included in the above RRC signaling and set or set in a separate RRC signaling format per n^DM-RS_ID.

As shown in Table 9, a PDSCH start symbol index of the I-PDSCH, ZP CSI-RS rate matching information about the I-PDSCH, NZP CSI-RS information about the I-PDSCH, for which QCL can be assumed, the number of CRS antenna ports (crs-PortsCount), CRS frequency shift value (crs-FreqShift), and MBSFN subframe configuration information (ID_mbsfn-SubframeConfigList), which are indicated by the PQI N3 bits, can be configured in the form as shown in Table 9 and previously provided to the NAICS UYE through RRC signaling. In addition, a specific state defined by the PQI N3 bits is dynamically indicated by the payload content of the A-DCI such that the NAICS UE can detect the I-PDSCH and perform SLIC.

ID_ZP-CSIRS_NAICS, ID_QCLed_CSIRS_NAICS, crs-PortsCount, crs-FreqShift and ID_mbsfn-SubframeConfigList can be simplified in specific index forms. In this case, information indicating a value (or bitmap information) corresponding to each index may be additionally provided to the NAICS UE through different RRC signaling.

Table 10 illustrates another embodiment of the present invention. In Table 10, it is assumed that N is 5 bits and I-PDSCH transmission in transmission mode 9 and I-PDSCH transmission in transmission mode 10 coexist. In this case, information such as a coding rate is unnecessary since SLIC is considered.

TABLE 10

MCS N1 = 2 bits

'00': QPSK
'01': 16QAM

TABLE 10-continued

'10': 64QAM
'11': Reserved (or 256QAM)

DM-RS N2 = 3 bits

'000': 1 layer, port 7, nSCID = 0, (n^DM-RS_ID is the same as DM-RS_ID for the detected (EPDCCH) A-DCI)
'001': 1 layer, port 7, nSCID = 1, (n^DM-RS_ID is the same as DM-RS_ID for the detected (EPDCCH) A-DCI)
'010': 1 layer, port 8, nSCID = 0, (n^DM-RS_ID is the same as DM-RS_ID for the detected (EPDCCH) A-DCI)
'011': 1 layer, port 8, nSCID = 1, (n^DM-RS_ID is the same as DM-RS_ID for the detected (EPDCCH) A-DCI)
'100': 2 layer, ports 7-8, nSCID = 0, (n^DM-RS_ID is the same as DM-RS_ID for the detected (EPDCCH) A-DCI)
'101': 2 layer, ports 7-8, nSCID = 1, (n^DM-RS_ID is the same as DM-RS_ID for the detected (EPDCCH) A-DCI)
'110': 3 layer, ports 7-9, nSCID = 0, (n^DM-RS_ID is the same as DM-RS_ID for the detected (EPDCCH) A-DCI)
'111': Reserved PQI N3 = 0 bits In Table 10, since PQI N3 is 0 bits, at least one of ZP CSI-RS rate matching information about the I-PDSCH, NZP CSI-RS information about the I-PDSCH, for which QCL can be assumed, the number of CRS antenna ports (crs-Ports-Count), CRS frequency shift value (crs-FreqShift) and MBSFN subframe configuration information (ID_mbsfn-SubframeConfigList) can conform to a specific PQI parameter set indicated by a specific EPDCCH configuration (previously provided through RRC signaling) from which the A-DCI has been detected.

A description will be given of operation of a UE which receives the A-DCI designed in the format as shown in Table 10. The UE may previously receive a plurality of EPDCCH configuration information. This information needs to include all specific EPDCCH configurations which can be set for other UEs of a specific neighbor cell. In other words, while an EPDCCH configuration provided to a UE of the neighbor cell can include only index information about specific PQI parameter set information, information provided to the NAICS UE may be provided in such a manner that the corresponding PQI parameter set information, instead of index information, is directly indicated.

Consequently, the NAICS UE preferentially finds a specific CRS detected with the highest signal strength through CRS list information about the neighbor cell and finds a specific NZP CSI-RS detected with the highest signal strength from among NZP CSI-RSs for which QCL can be assumed. Subsequently, the NAICS UE finds a specific EPDCCH configuration including the specific NZP CSI-RS as configuration information in the form of "ID_QCLed_C-SIRS_NAICS". The NAICS UE attempts to detect A-DCI from an EPDCCH using the specific EPDCCH configuration and, simultaneously, detects an I-PDSCH along with information indicated by the detected A-DCI by applying at least one of a DM-RS_ID, PDSCH start symbol index, ZP CSI-RS rate matching information, NZP CSI-RS information for which QCL can be assumed, the number of CRS antenna ports, CRS frequency shift value and MBSFN subframe configuration information, which are provided by the specific EPDCCH configuration.

As to DM-RS N2 bits, a specific TP can determine a maximum rank (or maximum number of layers) for UEs which will be scheduled by the TP and signal the maximum rank to other TPs through backhaul signaling between neighbor cells (or neighboring TPs). The DM-RS N2 bits can be defined as shown in Table 11 according to the aforementioned value v and used or semi-statically provided to the NAICS UE through RRC signaling. Particularly, for all states shown in Table 11, DM-RS_ID of an EPDCCH from which A-DCI has been detected can be defined to be identical to n^DM-RS_ID, as in Table 10.

TABLE 11

| DM-RS N2 = 2 bits when v = 1 | DM-RS N2 = 3 bits when v = 2 |
|---|---|
| '000': 1 layer, port 7, nSCID = 0 | '000': 1 layer, port 7, nSCID = 0 |
| '001': 1 layer, port 7, nSCID = 1 | '001': 1 layer, port 7, nSCID = 1 |
| '010': 1 layer, port 8, nSCID = 0 | '010': 1 layer, port 8, nSCID = 0 |
| '011': 1 layer, port 8, nSCID = 1 | '011': 1 layer, port 8, nSCID = 1 |
|  | '100': 2 layer, ports 7-8, nSCID = 0 |
|  | '101': 2 layer, ports 7-8, nSCID = 1 |
|  | '110': Reserved |
|  | '111': Reserved |

| DM-RS N2 = 3 bits when v = 3 | DM-RS N2 = 3 bits when v = 4 (or v = 2, 3, 4) |
|---|---|
| '000': 1 layer, port 7, nSCID = 0 | '000': 1 layer, port 7, nSCID = 0 |
| '001': 1 layer, port 7, nSCID = 1 | '001': 1 layer, port 7, nSCID = 1 |
| '010': 1 layer, port 8, nSCID = 0 | '010': 1 layer, port 8, nSCID = 0 |
| '011': 1 layer, port 8, nSCID = 1 | '011': 1 layer, port 8, nSCID = 1 |
| '100': 2 layer, ports 7-8, nSCID = 0 | '100': 2 layer, ports 7-8, nSCID = 0 |
| '101': 2 layer, ports 7-8, nSCID = 1 | '101': 2 layer, ports 7-8, nSCID = 1 |
| '110': 3 layer, ports 7-9, (nSCID = 0) | '110': 3 layer, ports 7-9, (nSCID = 0) |
| '111': Reserved | '111': 4 layer, ports 7-10, (nSCID = 0) |

| DM-RS N2 = 4 bits when v = 8 (or v = 5, 6, 7, 8) | |
|---|---|
| '0000': 1 layer, port 7, nSCID = 0 | '1000': 5 layer, ports 7-11, (nSCID = 0) |
| '0001': 1 layer, port 7, nSCID = 1 | '1001': 6 layer, ports 7-12, (nSCID = 0) |
| '0010': 1 layer, port 8, nSCID = 0 | '1010': 7 layer, ports 7-13, (nSCID = 0) |
| '0011': 1 layer, port 8, nSCID = 1 | '1011': 8 layer, ports 7-14, (nSCID = 0) |
| '0100': 2 layer, ports 7-8, nSCID = 0 | '1100': Reserved |
| '0101': 2 layer, ports 7-8, nSCID = 1 | '1101': Reserved |
| '0110': 3 layer, ports 7-9, (nSCID = 0) | '1110': Reserved |
| '0111': 4 layer, ports 7-10, (nSCID = 0) | '1111': Reserved |

In the present invention, a 1-bit indicator, which indicates whether a specific I-PDSCH is a CRS based PDSCH or a DM-RS based PDSCH, may be added to the N-bit payload of A-DCI with respect to the specific I-PDSCH and/or a 1-bit indicator indicating whether the I-PDSCH is a PDSCH or an EPDCCH may be added thereto. The 1-bit indicator indicating whether the I-PDSCH is a PDSCH or an EPDCCH may be mapped to "Reserved" state in the above examples.

However, when the 1-bit indicator indicating whether the I-PDSCH is a PDSCH or an EPDCCH may be mapped to "Reserved" state, if the indicator indicates the EPDCCH, it is necessary to divide a corresponding subband into levels less than a PRB pair and to attempt detection and thus complexity may increase. Accordingly, the NAICS UE can operate to exclude the corresponding subband from a detection attempt target. That is, in the case of an EPDCCH for other UEs, for example, UEs in a neighbor cell, ICS operation may cause performance deterioration according to whether the EPDCCH is a localized EPDDCH or a distributed EPDCCH or positions of ECCEs in which the EPDCCH is transmitted, and thus it may be desirable to exclude the corresponding subband from an NAICS target.

As another method for limiting interference cancellation with respect to an EPDCCH corresponding to an I-PDSCH, a representative EPDCCH set of a neighbor cell (e.g., a super-set of E-PDCCH sets used by UEs which may affect the neighbor cell) may be signaled. In addition, whether the I-PDSCH is a CRS based PDSCH or a DM-RS based PDSCH and whether the I-PDSCH is a PDSCH or an EPDCCH may be joint-encoded and applied as a 2-bit indicator.

As to the N-bit information defined in a specific format, as described above, when a neighbor cell (or neighboring TP), which transmits the corresponding A-DCI, reduces the payload size per subband from N bits to N-n bits so as to intend to broadcast A-DCI having a payload size of (N−n)K, a priority rule used by the NAICS UE and mapping of information corresponding to N1 bits, N2 bits and N3 bits to the reduced N-n bits may be defined or set through RRC signaling.

For example, when n=1, an (N2−1)-bit table instead of an N2-bit table can be applied. For example, in Table 11 with respect to the maximum number of layers, v, a lower v value can be set such that only N2−1 bits are applied.

When n=2, an (N2−1)-bit table instead of an N2-bit table can be applied and, simultaneously, only a modulation order of N1−1 bits can be applied. For example, when MCS N1=2 bits are changed to N1−1 bits in Tables 8 to 10, only '00': QPSK and '01': 16QAM can be applied.

Figure 14:
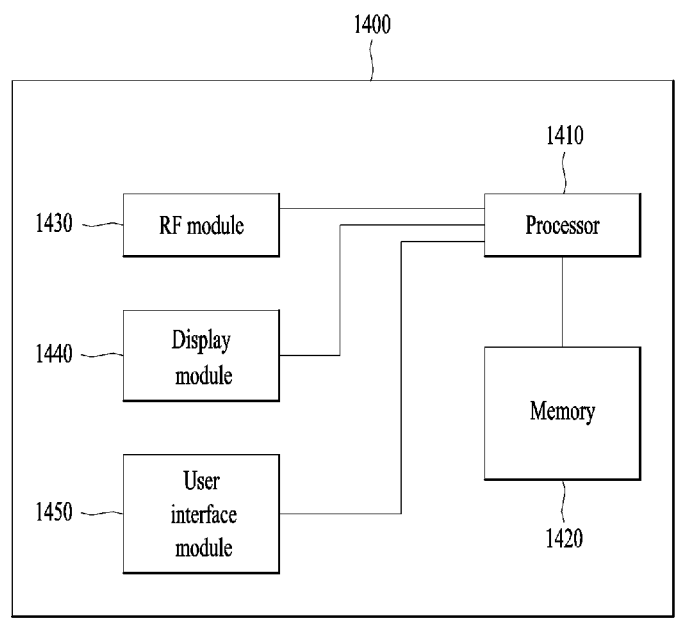
FIG. 14 is a block diagram of a communication apparatus according to an embodiment of the present invention.

FIG. 14 is a block diagram of a communication apparatus according to an embodiment of the present invention.

Referring to FIG. 14, a communication apparatus 1400 includes a processor 1410, a memory 1420, an RF module 1430, a display module 1440 and a user interface module 1450.

The communication apparatus 1400 is illustrated for convenience of description and some modules may be omitted. The communication apparatus 1400 may further include necessary modules. In addition, some modules of the communication apparatus 1400 may be divided into segmented modules. The processor 1410 is configured to perform the operations according to an embodiment of the present invention, illustrated with reference to the attached drawings. Specifically, detailed operation of the processor 1410 can refer to FIGS. 1 to 13.

The memory 1420 is connected to the processor 1420 and stores an operating system, applications, program code, data and the like. The RF module 1430 is connected to the processor 1410 and coverts a baseband signal into a radio signal or converts a radio signal into a baseband signal. To this end, the RF module 1430 performs analog conversion, amplification, filtering and frequency upconversion or reverse processes thereof. The display module 1440 is connected to the processor 1410 and displays various types of information. The display module 1440 is not limited thereto and can be implemented as a known element such as a liquid crystal display (LCD), a light emitting diode (LED) and an organic light emitting diode (OLED). The user interface module 1450 is connected to the processor 1410 and can be configured as a combination of known user interfaces such as a keypad, a touchscreen and the like.

The embodiments described above are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an exemplary embodiment of the present invention or included as a new claim by a subsequent amendment after the application is filed.

Specific operation performed by an eNB in the specification can be performed by an upper node as necessary. That is, various operations for communication with a UE in a network composed of a plurality of network nodes can be performed by an eNB or a network node other than the eNB. The term "eNB" can be replaced by the terms "fixed station", "Node B", "base station" and "access point".

Embodiments of the present invention may be achieved by various means, for example, hardware, firmware, software, or a combination thereof. In a hardware configuration, the methods according to exemplary embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the methods according to the embodiments of the present invention may be implemented in the form of a module, a procedure, a function, etc. performing the above-described functions or operations. A software code may be stored in the memory 2380 or 2390 and executed by the processor 2340 or 2330. The memory is located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein. It is obvious to those skilled in the art that claims that are not explicitly cited in each other in the appended claims may be presented in combination as an embodiment of the present invention or included as a new claim by a subsequent amendment after the application is filed.

INDUSTRIAL APPLICABILITY

While the method for canceling, by a UE, interference from a neighbor cell in a wireless communication system and the apparatus for the same are applied to a 3GPP LTE system in the above examples, the method and apparatus are applicable to various wireless communication systems in addition to the 3GPP LTE system.

The invention claimed is:

1. A method for cancelling, by a UE, interference from a neighbor cell in a wireless communication system, the method comprising:
receiving assisting downlink control information (DCI) from the neighbor cell,
wherein the assisting DCI is broadcast through a downlink control channel from the neighbor cell, and
wherein the assisting DCI includes one or more interference cancellation assistance information indicating one of a plurality of parameter combinations for detecting an interference signal from the neighbor cell;
detecting an interference signal from the neighbor cell based on the assisting DCI; and
cancelling the interference signal from signals received from a serving cell,
wherein a payload size of each interference cancellation assistance information included in the assisting DCI is determined based on content of the indicated parameter combination,
wherein the interference signal is a downlink data channel of the neighbor cell or a downlink control channel of the neighbor cell, and
wherein the plurality of parameter combinations is configured through a higher layer.

2. The method according to claim 1, wherein the parameter combinations include at least one of information about a modulation order of the interference signal, information about a reference signal for demodulating the interference signal and information about a symbol index at which the interference signal starts in a subframe.

3. The method according to claim 1, wherein the downlink data channel of the neighbor cell and the downlink control channel of the neighbor cell are detected through the same region of a subframe.

4. The method according to claim 1, wherein the one or more interference cancellation assistance information respectively correspond to different subbands.

5. A user equipment (UE) in a wireless communication system, the UE comprising:
a transceiver that transmits and receives a signal with a network; and
a processor configured to control the transceiver,
wherein the processor is further configured to:
control the transceiver to receive assisting downlink control information (DCI) from the neighbor cell,
wherein the assisting DCI is broadcast through a downlink control channel from the neighbor cell, and
wherein the assisting DCI includes one or more interference cancellation assistance information indicating one of a plurality of parameter combinations for detecting an interference signal from the neighbor cell,
detect an interference signal from the neighbor cell based on the assisting DCI, and
cancel the interference signal from signals received from a serving cell,
wherein a payload size of each interference cancellation assistance information included in the assisting DCI is determined based on content of the indicated parameter combination,
wherein the interference signal is a downlink data channel of the neighbor cell or a downlink control channel of the neighbor cell, and
wherein the plurality of parameter combinations is configured through a higher layer.

6. The UE according to claim 5, wherein the parameter combinations include at least one of information about a modulation order of the interference signal, information about a reference signal for demodulating the interference signal and information about a symbol index at which the interference signal starts in a subframe.

7. The UE according to claim 5, wherein the downlink data channel of the neighbor cell and the downlink control channel of the neighbor cell are detected through the same region of a subframe.

8. The UE according to claim 5, wherein the one or more interference cancellation assistance information respectively correspond to different subbands.

* * * * *